United States Patent
Xu et al.

(10) Patent No.: US 12,243,976 B2
(45) Date of Patent: Mar. 4, 2025

(54) LITHIUM-ION BATTERY OF FAST-CHARGING CAPABILITY

(71) Applicant: CONTEMPORARY AMPEREX TECHNOLOGY (HONG KONG) LIMITED, Hong Kong (CN)

(72) Inventors: Wenzhu Xu, Ningde (CN); Chuanmiao Yan, Ningde (CN); Fuping Luo, Ningde (CN); Xinxin Du, Ningde (CN); Jiao Cao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/959,991

(22) Filed: Oct. 4, 2022

(65) Prior Publication Data

US 2024/0113273 A1 Apr. 4, 2024

Related U.S. Application Data

(62) Division of application No. 16/443,371, filed on Jun. 17, 2019, now Pat. No. 11,502,328.

(30) Foreign Application Priority Data

Jun. 29, 2018 (CN) .......................... 201810695616.3
Jan. 31, 2019 (CN) .......................... 201910095235.6

(51) Int. Cl.
| | |
|---|---|
| *H01M 10/0525* | (2010.01) |
| *H01M 4/02* | (2006.01) |
| *H01M 4/131* | (2010.01) |
| *H01M 4/133* | (2010.01) |
| *H01M 4/36* | (2006.01) |
| *H01M 4/505* | (2010.01) |
| *H01M 4/525* | (2010.01) |
| *H01M 4/587* | (2010.01) |
| *H01M 10/04* | (2006.01) |

(52) U.S. Cl.
CPC ......... *H01M 10/0525* (2013.01); *H01M 4/02* (2013.01); *H01M 4/131* (2013.01); *H01M 4/133* (2013.01); *H01M 4/366* (2013.01); *H01M 4/505* (2013.01); *H01M 4/525* (2013.01); *H01M 4/587* (2013.01); *H01M 10/0459* (2013.01); *H01M 2004/021* (2013.01)

(58) Field of Classification Search
CPC ................................................ H01M 10/0525
See application file for complete search history.

(56) References Cited

U.S. PATENT DOCUMENTS

| | | | |
|---|---|---|---|
| 2015/0372349 A1 | 12/2015 | Shikita | |
| 2017/0077486 A1* | 3/2017 | Ishii | H01M 10/0525 |
| 2019/0027782 A1* | 1/2019 | Tamura | H01M 4/525 |
| 2019/0044136 A1* | 2/2019 | Sakai | C01G 53/44 |
| 2020/0266436 A1* | 8/2020 | Sakai | H01M 4/505 |
| 2020/0295351 A1* | 9/2020 | Piao | H01M 10/0525 |

FOREIGN PATENT DOCUMENTS

| | | | | |
|---|---|---|---|---|
| CN | 100464446 C | 2/2009 | | |
| CN | 102148364 A | 8/2011 | | |
| CN | 103199251 A | 7/2013 | | |
| CN | 106099080 A | 11/2016 | | |
| CN | 106486639 A | 3/2017 | | |
| CN | 107195960 A | 9/2017 | | |
| CN | 107403905 A * | 11/2017 | ......... | H01M 4/0404 |
| JP | 2002-279985 A | 9/2002 | | |
| JP | 2004-288398 A | 10/2004 | | |
| JP | 2016081757 A | 5/2016 | | |

OTHER PUBLICATIONS

CN107403905A Translation from Espacenet (Year: 2017).*
China Lithium Battery Technology Co., Ltd. Petitioner v. Contemporary Amperex Technology Co., Limited, Patent Owner, Petition for Post-Grant review of U.S. Pat. No. 10,930,932, Case No. PGR2022-00008, filed Nov. 23, 2021, 96 pgs.
Contemporary Amperex Technology Co., Limited, Extended European Search Report, EP19178043.6, Jul. 17, 2019. 6 pgs.
Contemporary Amperex Technology Co., Limited, Communication Pursuant to Article 94(3), EP19178043.6, Feb. 16, 2021, 4 pgs.
Contemporary Amperex Technology Co., Limited, First Office Action, CN201810558165.9, Aug. 4, 2020, 6 pgs.
Contemporary Amperex Technology Co., Limited, First Office Action, CN201810695616.3, Jan. 22, 2019, 9 pgs.
Contemporary Amperex Technology Co., Limited, First Office Action, CN201910095235.6, Mar. 2, 2020, 9 pgs.
Contemporary Amperex Technology Co., Limited, Second Office Action, CN201910095235.6, Aug. 4, 2020, 14 pgs.
Contemporary Amperex Technology Co., Limited, Third Office Action, CN201910095235.6, Feb. 2, 2021, 7 pgs.
JP2002279985A Translation from Espacenet (Year: 2002).
Xu, Office Action, U.S. Appl. No. 16/443,371, Jun. 21, 2021, 9 pgs.
Xu, Final Office Action, U.S. Appl. No. 16/443,371, Oct. 22, 2021, 9 pgs.
Xu, Office Action, U.S. Appl. No. 16/443,371, Jan. 28, 2022, 8 pgs.
Xu, Final Office Action, U.S. Appl. No. 16/443,371, May 10, 2022, 11 pgs.
Xu, Advisory Action, U.S. Appl. No. 16/443,371, Dec. 27, 2021, 5 pgs.

* cited by examiner

*Primary Examiner* — Nathanael T Zemui
(74) *Attorney, Agent, or Firm* — Kilpatrick Townsend & Stockton LLP

(57) ABSTRACT

The present disclosure provides a lithium-ion battery, the lithium-ion battery comprises a positive electrode plate, a negative electrode plate, a separator and an electrolyte, the positive active material comprises a layered lithium-containing compound, the negative active material comprises graphite, the positive film and the negative film satisfy a relationship $0.3 \leq (OI_c \times PD_c)/(OI_a \times PD_a) \leq 20.0$. The present disclosure can make the lithium-ion battery have smaller swelling and higher charging capability, and also make the lithium-ion battery have excellent cycle life and excellent safety performance during the long-term fast charging process.

20 Claims, No Drawings

LITHIUM-ION BATTERY OF FAST-CHARGING CAPABILITY

CROSS-REFERENCE TO RELATED APPLICATIONS

This application is a divisional application of U.S. patent application Ser. No. 16/443,371, entitled "LITHIUM-ION BATTERY" filed on Jun. 17, 2019, which claims priority to Chinese Patent Application No. 201810695616.3, filed with the State Intellectual Property Office of the People's Republic of China on Jun. 29, 2018, and Chinese Patent Application No. 201910095235.6, filed on Jan. 31, 2019, all of which are incorporated herein by reference in their entirety.

FIELD OF THE PRESENT DISCLOSURE

The present disclosure relates to the field of battery, and particularly relates to a lithium-ion battery.

BACKGROUND OF THE PRESENT DISCLOSURE

In recent years, environmental problems and economic problems of fuel caused by oil-fueled automotives have attracted more and more attention, people have an urgent desire for a green, environmentally-friendly and economical new energy automotive to alleviate the environmental problems and the economic problems caused by the oil-fueled automotives. A lithium-ion battery has become an indispensable part of the new energy automotives due to advantages such as high voltage, high energy density, long cycle life, low self-discharge, no pollution and the like. The lithium-ion battery is the heart of the new energy automotives, and charge speed and cycle life of the lithium-ion battery directly determine experience of users on the new energy automotives, therefore the lithium-ion battery having safe and fast charging capability and long cycle life has always been hotspots for research and improvement.

In order to shorten the charging time of the new energy automotive, the battery must have a fast charging capability. If a fast charging is forcibly performed on a battery which does not have fast charging capability, lithium dendrites are very easily grown on the surface of the negative electrode plate, which in turn results in a series of unfavorable effects on the battery, for example, the battery polarization increases, the power performance of the battery decreases and the life of the battery is drastically shortened. And moreover, the lithium dendrite with the continual growth may also puncture the separator during the use of the battery and result in an internal short circuit, which will bring safety hazard to the battery.

SUMMARY OF THE PRESENT DISCLOSURE

In view of the problem existing in the background, an object of the present disclosure is to provide a lithium-ion battery, which can make the lithium-ion battery have smaller swelling and higher charging capability, and also make the lithium-ion battery have excellent cycle life and excellent safety performance during the long-term fast charging process.

In order to achieve the above object, the present disclosure provides a lithium-ion battery, which comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a layered lithium-containing compound, the negative active material comprises graphite, the positive film and the negative film satisfy a relationship $0.3 \leq (OI_c \times PD_c)/(OI_a \times PD_a) \leq 20.0$. $OI_c$ represents an OI value of the positive film, and $OI_c = C_{003}/C_{110}$, $C_{003}$ represents characteristic diffraction peak area of (003) crystal plane in X-ray diffraction pattern of the positive electrode plate, $C_{110}$ represents characteristic diffraction peak area of (110) crystal plane in X-ray diffraction pattern of the positive electrode plate; $PD_c$ represents a pressing density of the positive film with a unit of $g/dm^3$; $OI_a$ represents an OI value of the negative film, and $OI_a = C_{004}/C_{110}$, $C_{004}$ represents characteristic diffraction peak area of (004) crystal plane in X-ray diffraction pattern of the negative electrode plate, $C_{110}$ represents characteristic diffraction peak area of (110) crystal plane in X-ray diffraction pattern of the negative electrode plate; $PD_a$ represents a pressing density of the negative film with a unit of $g/dm^3$.

Preferably, the positive film and the negative film satisfy a relationship $1.71 \leq (OI_c \times PD_c)/(OI_a \times PD_a) \leq 8.40$. More preferably, the positive film and the negative film satisfy a relationship $2.64 \leq (OI_c \times PD_c)/(OI_a \times PD_a) \leq 6.0$. Further more preferably, the positive film and the negative film satisfy a relationship $3.68 \leq (OI_c \times PD_c)/(OI_a \times PD_a) \leq 6.0$.

The positive film satisfies a relationship $79200 \leq OI_c \times PD_c \leq 323840$. Preferably, the positive film satisfies a relationship $110400 \leq OI_c \times PD_c \leq 182000$.

The negative film satisfies a relationship $20000 \leq OI_a \times PD_a \leq 50250$. Preferably, the negative film satisfies a relationship $20000 \leq OI_a \times PD_a 30000$.

The OI value of the positive film represented by $OI_c$ is 1070. Preferably, the OI value of the positive film represented by $OI_c$ is 2452.

The OI value of the negative film represented by $OI_a$ is 5~40.

The pressing density of the positive film represented by $PD_c$ is $3.3 \times 10^3$ $g/dm^3$~$3.5 \times 10^3$ $g/dm^3$.

The pressing density of the negative film represented by $PD_a$ is $1.4 \times 10^3$ $g/dm^3$~$1.65 \times 10^3$ $g/dm^3$.

The positive film and the negative film satisfy a relationship $1.78 \leq (OI_c \times \rho_c)/(OI_a \times \rho_a) \leq 6.0$, $\rho_c$ represents an areal density of the positive film with a unit of $g/cm^2$, $\rho_a$ represents an areal density of the negative film with a unit of $g/cm^2$. Preferably, the positive film and the negative film satisfy a relationship $2.52 \leq (OI_c \times \rho_c)/(OI_a \times \rho_a) \leq 6.0$.

The positive film satisfies a relationship $0.173 \leq OI_c \times \rho_c \leq 0.845$. Preferably, the positive film satisfies a relationship $0.353 \leq OI_c \times \rho_c \leq 0.845$.

The negative film satisfies a relationship $0.080 \leq OI_a \times \rho_a 0.360$. Preferably, the negative film satisfies a relationship $0.140 \leq OI_a \times \rho_a \leq 0.20$.

The areal density of the positive film represented by $\rho_c$ is 0.01 $g/cm^2$~0.02 $g/cm^2$. Preferably, the areal density of the positive film represented by $\rho_c$ is 0.015 $g/cm^2$~0.02 $g/cm^2$.

The areal density of the negative film represented by $\rho_a$ is 0.007 $g/cm^2$ 0.013 $g/cm^2$. Preferably, the areal density of the negative film represented by $\rho_a$ is 0.007 $g/cm^2$ 0.009 $g/cm^2$.

An average particle size D50 of the positive active material is 2 μm~10 μm. Preferably, the average particle size D50 of the positive active material is 2.5 μm~7.3 μm.

An average particle size D50 of the negative active material is 4 μm~15 μm. Preferably, the average particle size D50 of the negative active material is 5.5 μm~12 μm.

The layered lithium-containing compound is one or more selected from a group consisting of lithium nickel cobalt manganese oxide and lithium nickel cobalt aluminum oxide.

At least a part of the positive active material is single particle.

Compared with the existing technologies, the present disclosure at least includes the following beneficial effects: when the lithium-ion battery of the present disclosure is designed, by reasonably matching the relationship among the OI value of the positive film, the pressing density of the positive film, the OI value of the negative film and the pressing density of the negative film, the lithium ions can deintercalate from the positive electrode plate with a fast speed and then transmit onto the surface of the negative electrode plate with a fast speed and then intercalate into the negative electrode plate with a fast speed; and moreover, the positive electrode plate and the negative electrode plate both have smaller chemical rebound and excellent dynamics performance during the charging and discharging process, which is not only beneficial for the deintercalation and the intercalation of the lithium ions, but also beneficial for the transmission of the lithium ions, and in turn the lithium-ion battery can have smaller swelling and higher charging capability, and the lithium-ion battery can also have excellent cycle life and excellent safety performance during the long-term fast charging process.

DETAILED DESCRIPTION

Hereinafter a lithium-ion battery according to the present disclosure is described in detail.

The lithium-ion battery of the present disclosure comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a layered lithium-containing compound, the negative active material comprises graphite, the positive film and the negative film satisfy a relationship $0.3 \leq (OI_c \times PD_c)/(OI_a \times PD_a) \leq 20.0$.

$OI_c$ represents an OI value of the positive film, and $OI_c = C_{003}/C_{110}$, $C_{003}$ represents characteristic diffraction peak area of (003) crystal plane in X-ray diffraction pattern of the positive electrode plate, $C_{110}$ represents characteristic diffraction peak area of (110) crystal plane in X-ray diffraction pattern of the positive electrode plate.

$PD_c$ represents a pressing density of the positive film with a unit of $g/dm^3$.

$OI_a$ represents an OI value of the negative film, and $OI_a = C_{004}/C_{110}$, $C_{004}$ represents characteristic diffraction peak area of (004) crystal plane in X-ray diffraction pattern of the negative electrode plate, $C_{110}$ represents characteristic diffraction peak area of (110) crystal plane in X-ray diffraction pattern of the negative electrode plate.

$PD_a$ represents a pressing density of the negative film with a unit of $g/dm^3$.

The OI value of the positive film may reflect the orientation degree of the stacked layered lithium-containing compound particles in the positive film, and reflect the actual deintercalation capability with respect to the lithium ions in the positive film. Generally, there is a stronger c-axis orientation (that is (003) crystal plane orientation) in the layered lithium-containing compound, which will affect the deintercalation of the lithium ions, and in turn affect the dynamics performance of the lithium-ion battery. An angle between (003) crystal plane and (110) crystal plane in the layered lithium-containing compound is 90°, therefore $C_{003}/C_{110}$ may reflect the orientation degree of the layered lithium-containing compound. However, the positive electrode plate further comprises non-active materials such as a conductive agent and a binder besides the layered lithium-containing compound, and these non-active materials cannot deintercalate the lithium ions; and moreover, cold pressing, baking and the like usually tend to change the orientation of the layered lithium-containing compound during the preparation process of the positive electrode plate, therefore an OI value of a powder of the layered lithium-containing compound cannot reflect the actual deintercalation capability with respect to the lithium ions in the positive electrode plate. The smaller the OI value of the positive film is, the more prone the layered lithium-containing compound particles in the positive film are to be perpendicular to the positive current collector (that is the (003) crystal plane is more prone to be perpendicular to the positive current collector), therefore the lithium ions are more easily deintercalated from the crystal structure of the layered lithium-containing compound with a fast speed, which is more beneficial for improving the charging capability of the lithium-ion battery.

Moreover, the smaller the OI value of the positive film is, the smaller the residual stress in the positive film is, and the smaller the swelling of the positive electrode plate during the cycle process is. The smaller the swelling of the positive electrode plate is, the smaller the risk of positive electrode plate fracture and even the risk of internal short circuit of the battery due to the swelling of the positive electrode plate are; the smaller the swelling of the positive electrode plate is, the smaller the probability of poor electrolyte infiltration due to squeeze on the negative electrode plate caused by the swelling of the positive electrode plate is, which may avoid the increase of the battery polarization during the charging process, prevent the lithium metal from being precipitated on a part of the surface of the negative electrode plate, and prevent the capacity of the battery during the cycle process from decaying too fast; the smaller the swelling of the positive electrode plate is, the smaller the looseness degree of the positive active material particles caused by the swelling of the positive electrode plate is, and the smaller the probability of positive conductive network break is, which may avoid the increase of the battery polarization during the charging process, prevent the decrease of the charging and discharging rate of the battery, and prevent the increase of the heat production.

The pressing density of the positive film is a ratio of the areal density per unit area to the thickness of the positive film on one surface of the positive current collector, the transmission speed of the lithium ions in the channels of the positive film is closely related with the pressing density of the positive film. When other conditions are the same, the smaller the pressing density of the positive film is, the smaller the film resistance of the positive film is, the smaller the internal resistance of the battery is, the smaller the polarization during the charging process is, the faster the transmission speed of the lithium ions in the channels of the positive film is, the better the dynamics performance of the positive electrode plate is, which is more beneficial for improving the charging capability of the lithium-ion battery.

The OI value of the negative film may reflect the orientation degree of the stacked graphite particles in the negative film, and reflect the actual intercalation capability and the actual deintercalation capability with respect to the lithium ions in the negative electrode plate. An angle between (004) crystal plane and (110) crystal plane in the graphite is 90°, therefore $C_{004}/Ciao$ may reflect the orientation degree of the graphite. However, the negative electrode plate further comprises non-active materials such as a conductive agent and a binder besides the graphite, and the lithium ions cannot intercalate into these non-active materials; and moreover, cold pressing, baking and the like usually tend to change the orientation of the graphite during the preparation process of the negative electrode plate, therefore the OI value of the graphite cannot reflect the actual intercalation capability and the actual deintercalation capability with respect to the lithium ions in the negative electrode plate.

The smaller the OI value of the negative film is, the more prone the graphite particles in the negative film are to be perpendicular to the negative current collector (that is (004) crystal plane is more prone to be perpendicular to the negative current collector), therefore the negative electrode plate may timely accept all the lithium ions deintercalated from the positive electrode plate, and prevent the lithium ions from being directly reduced and precipitated on the surface of the negative electrode plate and in turn formed into lithium dendrite, therefore the lithium-ion battery can have longer cycle life and higher safety performance during the long-term fast charging process.

The pressing density of the negative film is a ratio of the areal density per unit area to the thickness of the negative film on one surface of the negative current collector, the transmission speed of the lithium ions in the channels of the negative film is closely related with the pressing density of the negative film. When other conditions are the same, the smaller the pressing density of the negative film is, the smaller the internal resistance of the battery is, the smaller the polarization during the charging process is, the faster the transmission speed of the lithium ions in the channels of the negative film is, the better the dynamics performance of the negative electrode plate is, which is more beneficial for improving the charging capability of the lithium-ion battery.

Therefore, when the lithium-ion battery of the present disclosure is designed, by reasonably matching the relationship among the OI value of the positive film, the pressing density of the positive film, the OI value of the negative film and the pressing density of the negative film, the lithium ions can deintercalate from the positive electrode plate with a fast speed and then transmit onto the surface of the negative electrode plate with a fast speed and then intercalate into the negative electrode plate with a fast speed; and moreover, the positive electrode plate and the negative electrode plate both have smaller chemical rebound and excellent dynamics performance during the charging and discharging process, which is not only beneficial for the deintercalation and the intercalation of the lithium ions, but also beneficial for the transmission of the lithium ions. Therefore the lithium-ion battery of the present disclosure can have smaller swelling and higher charging capability, and the lithium-ion battery can also have excellent cycle life and excellent safety performance during the long-term fast charging process.

In some embodiments of the present disclosure, a lower limit value of $(OI_c \times PD_c)/(OI_a\ PD_a)$ may be any one of 0.3, 0.5, 0.8, 1.0, 1.1, 1.3, 1.5, 2.0, 2.2, 2.3, 2.5, 2.8, 3.0, 3.2, 3.3, 3.5, 3.6 and 3.7; an upper limit value of $(OI_c \times PD_c)/(OI_a \times PD_a)$ may be any one of 3.0, 4.0, 4.5, 5.0, 5.3, 5.5, 5.7, 5.9, 6.0, 6.5, 7.0, 7.3, 7.6, 7.9, 8.0, 8.5, 9.0, 9.5, 10.0, 10.5, 11.0, 11.5, 12.0, 13.0, 14.0, 15.0, 17.0, 19.0 and 20.0.

Preferably, the positive film and the negative film satisfy a relationship $0.5 \leq (OI_c \times PD_c)/(OI_a \times PD_a) \leq 11.0$.

More preferably, the positive film and the negative film satisfy a relationship $1.0 \leq (OI_c \times PD_c)/(OI_a \times PD_a) \leq 8.0$.

Further more preferably, the positive film and the negative film satisfy a relationship $1.0 \leq (OI_c \times PD_c)/(OI_a \times PD_a) \leq 60.0$.

In the lithium-ion battery of the present disclosure, the positive film satisfies a relationship $1 \times 10^4 \leq OI_c \times PD_c \leq 5 \times 10^5$. When the positive electrode plate of the lithium-ion battery of the present disclosure is designed, by reasonably matching the relationship between the OI value of the positive film represented by $OI_c$ and the pressing density of the positive film represented by $PD_c$, the positive electrode plate can have smaller chemical rebound and excellent dynamics performance during the charging and discharging process, which is not only beneficial for the deintercalation and the intercalation of the lithium ions, but also beneficial for the transmission of the lithium ions, and in turn the lithium-ion battery can have smaller swelling and higher charging capability, and the lithium-ion battery can also have excellent cycle life and excellent safety performance during the long-term fast charging process.

If the product of the OI value of the positive film represented by $OI_c$ and the pressing density of the positive film represented by $PD_c$ is too small, when a fast charging is performed on the lithium-ion battery at this time, the lithium ions can deintercalate from the crystal structure of the positive active material with a fast speed and then transmit onto the surface of the negative electrode plate with a fast speed, however, the too fast deintercalation speed and the too fast transmission speed will make the lithium ions be unable to timely intercalate into the negative active material, a part of the lithium ions will be directly reduced and precipitated on the surface of the negative electrode plate and in turn formed into lithium dendrite; and moreover, the lithium dendrite with the continual growth will also puncture the separator during the charging and discharging cycle process of the lithium-ion battery and result in larger safety hazard; furthermore, the lithium dendrite with the continual growth will also consume too many lithium ions, and the capacity of the lithium-ion battery during the cycle process will decay too fast.

If the product of the OI value of the positive film represented by $OI_c$ and the pressing density of the positive film represented by $PD_c$ is too large, the residual stress in the positive film is usually too large, the swelling of the positive electrode plate during the cycle process is too large and the dynamics performance of the positive electrode plate itself is very bad. When a fast charging is performed on the lithium-ion battery at this time, the lithium ions are very difficult to smoothly deintercalate from the crystal structure of the positive active material and the lithium ions are unable to transmit onto the surface of the negative electrode plate with a fast speed, the battery polarization will continually increase during the charging and discharging cycle process, the charging capability of the lithium-ion battery becomes very bad, and the lithium-ion battery can no longer be charged or can only be charged under a very small current. Moreover, the larger the swelling of the positive electrode plate is, the larger the risk of positive electrode plate fracture and even the risk of internal short circuit of the battery are, the larger the probability of poor electrolyte infiltration due to excessive squeeze on the negative electrode plate is, the larger the looseness degree of the positive active material particles is, and the larger the probability of positive conductive network break is, which will result in a continual increase on the battery polarization during the charging process, a continual increase on the amount of the lithium metal precipitated on a part of the surface of the negative electrode plate and a too fast decay speed on the capacity of the lithium-ion battery during the cycle process.

Preferably, the positive film satisfies a relationship $1.5 \times 10^4 \leq OI_c \times PD_c \leq 4.5 \times 10^5$.

More preferably, the positive film satisfies a relationship $2 \times 10^4 \leq OI_c \times PD_c \leq 4 \times 10^5$.

In the lithium-ion battery of the present disclosure, the negative film satisfies a relationship $2 \times 10^3 \leq OI_a \times PD_a \leq 1.5 \times 10^5$. When the negative electrode plate of the lithium-ion battery of the present disclosure is designed, by reasonably further matching the relationship between the OI value of the negative film represented by $OI_a$ and the pressing density of the negative film represented by $PD_a$, the performances of the lithium-ion battery may be better, the lithium-ion battery may have higher charging capability, and the lithium-ion battery may also have longer cycle life and higher safety performance during the long-term fast charging process.

If the product of the OI value of the negative film and the pressing density of the negative film is too small, when a fast charging is performed on the lithium-ion battery at this time, the dynamics performance of the positive electrode plate and the dynamics performance of the negative electrode plate fail to achieve the optimal matching because the deintercalation speed of the lithium ions in the positive electrode plate becomes relatively slow, the battery polarization during the charging and discharging cycle process may become larger, which is not beneficial for further improving the performances of the lithium-ion battery.

If the product of the OI value of the negative film and the pressing density of the negative film is too large, when a fast charging is performed on the lithium-ion battery at this time, the negative electrode plate may be unable to timely accept all the lithium ions deintercalated from the positive electrode plate, a part of the lithium ions may be directly reduced and precipitated on the surface of the negative electrode plate and in turn formed into lithium dendrite, which is not beneficial for further improving the performances of the lithium-ion battery.

Preferably, the negative film satisfies a relationship $5 \times 10^3 \leq OI_a \times PD_a \leq 1 \times 10^5$.

More preferably, the negative film satisfies a relationship $1 \times 10^4 \leq OI_a \times PD_a \leq 7.5 \times 10^4$.

In the lithium-ion battery of the present disclosure, preferably, the OI value of the positive film represented by $OI_c$ is 5~200. More preferably, the OI value of the positive film represented by $OI_c$ is 10~100. When the OI value of the positive film falls within the above preferred ranges thereof, the resistance with respect to the lithium ions to deintercalate from or intercalate into the positive active material is smaller, the dynamics performance of the positive electrode plate is better and the swelling of the positive electrode plate is smaller, which may further improve the charging capability and the cycle life of the lithium-ion battery.

In the lithium-ion battery of the present disclosure, preferably, the pressing density of the positive film represented by $PD_c$ is $2.5 \times 10^3$ g/dm$^3$~$4.0 \times 10^3$ g/dm$^3$. More preferably, the pressing density of the positive film represented by $PD_c$ is $3.0 \times 10^3$ g/dm$^3$~$4.0 \times 10^3$ g/dm$^3$. When the pressing density of the positive film falls within the above preferred ranges thereof, the integrity of the positive active material particles is higher, the electrical contact between the positive active material particles is better, and the positive film has better electrolyte retention capability, which is beneficial for the electrolyte to sufficiently infiltrate the positive active material, and in turn the charge transfer impedance at the interface between the positive active material and the electrolyte is lower, thereby further improving the charging capability and the cycle life of the lithium-ion battery.

In the lithium-ion battery of the present disclosure, preferably, the OI value of the negative film represented by $OI_a$ is 1~60. More preferably, the OI value of the negative film represented by $OI_a$ is 5~40. When the OI value of the negative film falls within the above preferred ranges thereof, the resistance with respect to the lithium ions to intercalate into or deintercalate from the negative active material is smaller, thereby further improving the charging capability and the cycle life of the lithium-ion battery.

In the lithium-ion battery of the present disclosure, preferably, the pressing density of the negative film represented by $PD_a$ is $1.0 \times 10^3$ g/dm$^3$~$2.0 \times 10^3$ g/dm$^3$. More preferably, the pressing density of the negative film represented by $PD_a$ is $1.4 \times 10^3$ g/dm$^3$~$1.8 \times 10^3$ g/dm$^3$. When the pressing density of the negative film falls within the above preferred ranges thereof, the integrity of the negative active material particle is higher, the electrical contact between the negative active material particles is better, and the negative film has better electrolyte retention capability, which is beneficial for the electrolyte to sufficiently infiltrate the negative active material, and in turn the charge transfer impedance at the interface between the negative active material and the electrolyte is lower, thereby further improving the charging capability and the cycle life of the lithium-ion battery.

The areal density of the positive film and the areal density of the negative film will also affect the performances of the lithium-ion battery, and the value of the areal density of the positive film and the value of the areal density of the negative film will directly affect the energy density, the dynamics performance and the cycle life of the lithium-ion battery. The smaller the areal density of the film (i.e. the positive film and the negative film) is, the less the active material (i.e. the positive active material and the negative active material) coated on the current collector (i.e. the positive current collector and the negative current collector) is, the shorter the transmission path of the lithium ions during the charging and discharging process of the lithium-ion battery is, the better the dynamics performance of the lithium-ion battery is; and moreover, the smaller the areal density of the film (i.e. the positive film and the negative film) is, the higher the ratio of the active material (i.e. the positive active material and the negative active material) that could function during the charging and discharging process of the lithium-ion battery is, the higher the use efficiency of the active material (i.e. the positive active material and the negative active material) is. Furthermore, the value of the particle size of the active material (i.e. the positive active material and the negative active material) will affect the value of the areal density of the film (i.e. the positive film and the negative film), therefore selecting an active material having a reasonable particle size is beneficial for improving the energy density, the dynamics performance and the cycle life of the lithium-ion battery.

The inventors further found that, when the positive film and the negative film further satisfy a relationship $0.1 \leq (OI_c \times \rho_c)/(OI_a \times \rho_a) \leq 15.0$, the lithium-ion battery can have higher energy density, good dynamics performance and longer cycle life at the same time. $\rho_c$ represents an areal density of the positive film with a unit of g/cm$^2$, $\rho_a$ represents an areal density of the negative film with a unit of g/cm$^2$.

If the ratio of $OI_c \times \rho_c$ to $OI_a \times \rho_a$ is too small, the value of $OI_c \times \rho_c$ may be smaller and/or the value of $OI_a \times \rho_a$ may be larger, although the deintercalation capability with respect to the lithium ions in the positive electrode plate is stronger and the dynamics performance of the positive electrode plate is better at this time, the energy density of the lithium-ion battery is seriously affected, and the improvement on the energy density of the lithium-ion battery is not obvious even if the pressing density of the positive film is further improved.

If the ratio of $OI_c \times \rho_c$ to $OI_a \times \rho_a$ is too large, the value of $OI_c \times \rho_c$ may be larger and/or the value of $OI_a \times \rho_a$ may be smaller, although the energy density of the lithium-ion battery is higher at this time, the negative electrode plate cannot provide sufficiently enough intercalation space for the lithium ions, which has become a bottleneck that suppresses the fast charging of the lithium-ion battery, the lithium metal is easily precipitated on the negative electrode plate, the dynamics performance of the lithium-ion battery is affected, more seriously, the capacity of the lithium-ion battery will be dived during the cycle process.

Therefore, when the lithium-ion battery is designed, by further comprehensively matching the relationship among the OI value of the positive film represented by $OI_c$, the areal density of the positive film represented by pc, the OI value of the negative film represented by $OI_a$ and the areal density of the negative film represented by pa, and making the value of $(OI_c \times \rho_c)/(OI_a \times \rho_a)$ be between 0.1 and 15.0, the lithium-ion battery may have higher energy density, good dynamics performance and longer cycle life at the same time.

In some embodiments of the present disclosure, a lower limit value of $(OI_c \times \rho_c)/(OI_a \times \rho_a)$ may be any one of 0.1, 0.3, 0.5, 0.6, 0.8, 1.0, 1.3, 1.5, 1.6, 1.7, 1.8, 2.0, 2.2, 2.3, 2.5, 2.8, 3.0, 3.2, 3.3, 3.5, 3.6, 3.7, 4.0, 4.2 and 4.5; an upper limit value of $(OI_c \times \rho_c)/(OI_a \times \rho_a)$ may be any one of 4.0, 5.0, 6.0, 6.5, 7.0, 7.3, 7.6, 7.9, 8.0, 8.5, 9.0, 9.5, 10.0, 10.5, 11.0, 11.5, 12.0, 13.0, 14.0 and 15.0.

Preferably, the positive film and the negative film satisfy a relationship $0.5 \leq (OI_c \times \rho_c)/(OI_a \times \rho_a) \leq 8.0$.

More preferably, the positive film and the negative film satisfy a relationship $1.0 \leq (OI_c \times \rho_c)/(OI_a \times \rho_a) \leq 6.0$.

In the lithium-ion battery of the present disclosure, preferably, the positive film satisfies a relationship $0.015 \leq OI_c \times \rho_c \leq 4$.

If the product of the OI value of the positive film and the areal density of the positive film is too small, the areal density of the positive film usually is smaller, the OI value of the positive film is also prone to be smaller, although the swelling of the positive electrode plate during the charging and discharging process of the lithium-ion battery is smaller, which will not squeeze the negative electrode plate and affect the dynamics performance of the negative electrode plate, the positive active material particles are easily crushed during the cold pressing process of the positive electrode plate, and the probability of crystal damage of the positive active material increases, which is not beneficial for further improving the cycle life of the lithium-ion battery. Furthermore, the energy density of the lithium-ion battery is also lower.

If the product of the OI value of the positive film and the areal density of the positive film is too large, the OI value of the positive film and the areal density of the positive film usually are both larger or one of the OI value of the positive film and the areal density of the positive film usually is larger. When the OI value of the positive film is larger, the residual stress inside the positive film usually is larger, the deintercalation speed and the intercalation speed of the lithium ions in the positive electrode plate are slower, the dynamics performance of the positive electrode plate is worse; and moreover, the swelling of the positive electrode plate during the charging and discharging process of the lithium-ion battery is larger, which will squeeze the negative electrode plate and in turn affect the dynamics performance of the negative electrode plate, finally the lithium metal will be precipitated on the negative electrode plate. When the areal density of the positive film is larger, the infiltration of the electrolyte into the positive electrode plate is worse, the electrolyte cannot sufficiently infiltrate the positive active material, in turn the charge transfer impedance at the interface between the positive active material and the electrolyte is higher, and it is not beneficial for further improving the charging capability and the cycle life of the lithium-ion battery.

More preferably, the positive film satisfies a relationship $0.05 \leq OI_c \times \rho_c \leq 2$.

In the lithium-ion battery of the present disclosure, preferably, the negative film satisfies a relationship $0.002 \leq OI_a \times \rho_a \leq 1.5$.

If the product of the OI value of the negative film and the areal density of the negative film is too small, the areal density of the negative film usually is smaller, the OI value of the negative film is also prone to be smaller, the lithium ions can intercalate into the negative active material with a fast speed, however, the negative electrode plate cannot provide sufficiently enough intercalation space for the lithium ions, finally a part of the lithium ions will be directly reduced and precipitated on the surface of the negative electrode plate and in turn formed into lithium dendrite, therefore it is not beneficial for further improving the performances of the lithium-ion battery.

If the product of the OI value of the negative film and the areal density of the negative film is too large, the OI value of the negative film and the areal density of the negative film usually are both larger or one of the OI value of the negative film and the areal density of the negative film usually is larger. When the OI value of the negative film is larger, the residual stress inside the negative film usually is larger, the deintercalation speed and the intercalation speed of the lithium ions in the negative electrode plate are slower, the dynamics performance of the negative electrode plate is worse; and moreover, the negative electrode plate may be unable to timely accept all the lithium ions deintercalated from the positive electrode plate, finally a part of the lithium ions may be directly reduced and precipitated on the surface of the negative electrode plate and in turn formed into lithium dendrite, therefore it is not beneficial for further improving the performances of the lithium-ion battery. When the areal density of the negative film is larger, the infiltration of the electrolyte into the negative electrode plate is worse, the electrolyte cannot sufficiently infiltrate the negative active material, in turn the charge transfer impedance at the interface between the negative active material and the electrolyte is higher, therefore it is not beneficial for further improving the charging capability and the cycle life of the lithium-ion battery.

More preferably, the negative film satisfies a relationship $0.02 \leq OI_a \times \rho_a \leq 0.8$.

In the lithium-ion battery of the present disclosure, preferably, the areal density of the positive film represented by $\rho_c$ is 0.006 g/cm$^2$~0.03 g/cm$^2$. More preferably, the areal density of the positive film represented by $\rho_c$ is 0.01 g/cm$^2$~0.02 g/cm$^2$.

In the lithium-ion battery of the present disclosure, preferably, the areal density of the negative film represented by $\rho_a$ is 0.002 g/cm$^2$~0.025 g/cm$^2$. More preferably, the areal density of the negative film represented by $\rho_a$ is 0.004 g/cm$^2$~0.02 g/cm$^2$.

In the lithium-ion battery of the present disclosure, the layered lithium-containing compound may be one or more selected from a group consisting of LiCoO$_2$, LiNiO$_2$, LiMnO$_2$ and Li$_a$Ni$_x$Co$_y$M$_{1-x-y}$O$_2$, M is one or two selected from a group consisting of Al and Mn, 0.95≤a≤1.2, 0<x<1, 0<y<1, 0<x+y<1.

Doping modification and/or coating modification may be further performed on the above layered lithium-containing compound.

The doping modification may be cation doping, anion doping or anion-cation complex doping, the purpose of the doping modification is to dope some cations, anions or complex ions into the crystal lattice of the positive active material so as to reduce Li/Ni cation mixing, it is beneficial for reducing the first cycle irreversible capacity, making the integrity of the layered structure of the positive active material more complete, making the stability of the crystal structure of the positive active material higher, and making the probability of particle break and the probability of crystal structure damage lower, in turn it is beneficial for improving the cycle performance and the thermal stability of the lithium-ion battery. The specific method of the doping modification is not limited, for example, a wet doping may be used in the coprecipitation stage of the precursor, or a dry doping may be used in the sintering stage.

Preferably, an element used in the cation doping may be one or more selected from a group consisting of Al, Zr, Ti, B, Mg, V, Cr, Zn and Y.

Preferably, an element used in the anion doping may be one or more selected from a group consisting of F, P and S, F is more preferable. F may not only promote the sintering of the positive active material so as to make the structure of the positive active material more stable, but also may stabilize the interface between the positive active material and the electrolyte during the cycle process, therefore it is beneficial for improving the cycle performance of the lithium-ion battery.

Preferably, a total doping amount of the cations and the anions is not more than 20%.

The coating modification is to form a coating layer on the surface of the positive active material so as to separate the electrolyte and the positive active material and prevent the electrolyte from directly contacting the positive active material, which may reduce the side reactions between the electrolyte and the positive active material to a large extent, reduce the dissolution of the transition metals inside the positive active material, and improve the electrochemical stability of the positive active material. The presence of the coating layer may also inhibit the collapse of the crystal structure of the positive active material during the repeated charging and discharging process, reduce the probability of particle break and the probability of crystal structure damage, therefore it is beneficial for improving the cycle performance of the lithium-ion battery. The specific method of the coating modification is not limited, for example, a wet coating may be used in the coprecipitation stage of the precursor, or a dry coating may be used in the sintering stage.

Preferably, the coating layer may be one or more selected from a group consisting of a carbon layer, a graphene layer, an oxide layer, an inorganic salt layer and a conductive polymer layer. The oxide may be an oxide formed from one or more selected from a group consisting of Al, Ti, Mn, Zr, Mg, Zn, Ba, Mo and B; the inorganic salt may be one or more selected from a group consisting of Li$_2$ZrO$_3$, LiNbO$_3$, Li$_4$Ti$_5$O$_{12}$, Li$_2$TiO$_3$, LiTiO$_2$, Li$_3$VO$_4$, LiSnO$_3$, Li$_2$SiO$_3$, LiAlO$_2$, AlPO$_4$ and AlF$_3$; the conductive polymer may be polypyrrole (PPy), poly(3,4-ethylenedioxythiophene) (PEDOT) or polyamide (PI).

Preferably, a mass of the coating layer is not more than 20%.

Preferably, the layered lithium-containing compound may be one or more specifically selected from a group consisting of LiCoO$_2$, LiNiO$_2$, LiMnO$_2$, LiNi$_{1/3}$Co$_{1/3}$Mn$_{1/3}$O$_2$ (NCM333), LiNi$_{0.5}$Co$_{0.2}$Mn$_{0.3}$O$_2$ (NCM523), LiNi$_{0.6}$Co$_{0.2}$Mn$_{0.2}$O$_2$ (NCM622), LiNi$_{0.8}$Co$_{0.1}$Mn$_{0.1}$O$_2$ (NCM811) and LiNi$_{0.85}$Co$_{0.15}$Al$_{0.05}$O$_2$.

The positive active material may further comprise one or more selected from a group consisting of spinel lithium manganese oxide (LiMn$_2$O$_4$), spinel lithium nickel manganese oxide (LiNi$_x$Mn$_{2-x}$O$_4$, 0<x<2) and polyanion-type positive active material besides the layered lithium-containing compound. The polyanion-type positive active material may be phosphate polyanion-type positive active material, silicate polyanion-type positive active material and sulfate polyanion-type positive active material. The phosphate polyanion-type positive active material typically may be LiFePO$_4$, LiMnPO$_4$, LiVPO$_4$F and Li$_3$V$_2$(PO$_4$)$_3$; the silicate polyanion-type positive active material typically may be Li$_2$FeSiO$_4$, Li$_2$MnSiO$_4$, Li$_2$CoSiO$_4$ and Li$_2$NiSiO$_4$; the sulfate polyanion-type positive active material typically may be Li$_2$Fe$_2$(SO$_4$)$_3$ and LiFeSO$_4$F.

In the lithium-ion battery of the present disclosure, at least a part of the positive active material is single particle (it means non-agglomerated particle). The positive active material which is single particle may improve the whole pressing density and the extensibility of the positive electrode plate, and reduce the contact area between the positive active material and the electrolyte, reduce the occurrence of the side reactions at the interface between the positive active material and the electrolyte, reduce the amount of gas to be generated, thereby further improving the cycle performance of the lithium-ion battery.

In the lithium-ion battery of the present disclosure, the graphite is one or more selected from a group consisting of artificial graphite, natural graphite and modified graphite. The negative active material may further comprise one or more selected from a group consisting of soft carbon, hard carbon, carbon fiber, mesocarbon microbeads, silicon-based material, tin-based material and lithium titanate besides the graphite. The silicon-based material may be one or more selected from a group consisting of elemental silicon, silicon oxide, silicon carbon composite and silicon alloy; the tin-based material may be one or more selected from a group consisting of elemental tin, tin oxide compound and tin alloy.

In the lithium-ion battery of the present disclosure, the type of the positive current collector is not specifically limited and may be selected based on actual demands, for example, the positive current collector may be an aluminum foil, a nickel foil or a polymer conductive film, and preferably, the positive current collector is the aluminum foil.

In the lithium-ion battery of the present disclosure, the type of the negative current collector is not specifically limited and may be selected based on actual demands, for example, the negative current collector may be a copper foil, a carbon coated copper foil or a polymer conductive film, and preferably, the negative current collector is the copper foil.

In the lithium-ion battery of the present disclosure, the positive film further comprises a conductive agent and a binder, the types and the contents of the conductive agent and the binder are not specifically limited and may be selected based on actual demands.

In the lithium-ion battery of the present disclosure, the negative film further comprises a conductive agent and a binder, the types and the contents of the conductive agent and the binder are not specifically limited and may be selected based on actual demands.

In the lithium-ion battery of the present disclosure, the OI value of the powder and the particle size of the active material (i.e. the positive active material and the negative active material) in the positive film and the negative film both will affect the OI value, the pressing density and the areal density of the film (i.e. the positive film and the negative film), therefore each parameter of the film (i.e. the positive film and the negative film) can be adjusted by selecting an appropriate active material (i.e. the positive active material and the negative active material).

Preferably, the OI value of the powder of the positive active material represented by $G_{OI}$ is 3~15. More preferably, the OI value of the powder of the positive active material represented by $G_{OI}$ is 5~10. When the OI value of the powder of the positive active material falls within the above preferred ranges thereof, the positive active material as a whole can have better isotropy, which is more beneficial for the deintercalation and the intercalation of the lithium ions.

Preferably, the average particle size D50 of the positive active material is 1 µ3~20 µm. More preferably, the average particle size D50 of the positive active material is 2 µm~10 µm. When the particle size of the positive active material falls within the above preferred ranges thereof, the positive electrode plate can have better homogeneity, thereby preventing the positive active material with too small particle size from affecting the performances of the lithium-ion battery by generating more side reactions with the electrolyte, and also preventing the positive active material with too large particle size from affecting the performances of the lithium-ion battery by hindering the transmission of the lithium ions inside the positive active material. When the particle size of the positive active material falls within the above preferred ranges thereof, the lithium-ion battery may also have higher energy density.

Preferably, the OI value of the powder of the negative active material represented by $V_{OI}$ is 0.510. More preferably, the OI value of the powder of the negative active material represented by $V_{OI}$ is 3~6. When the OI value of the powder of the negative active material falls within the above preferred ranges thereof, the negative active material as a whole can have better isotropy, which is more beneficial for the intercalation and the deintercalation of the lithium ions.

Preferably, the average particle size D50 of the negative active material is 1 µm~20 µm. More preferably, the average particle size D50 of the negative active material is 4 µm~15 When the particle size of the negative active material falls within the above preferred ranges thereof, the negative electrode plate can have better homogeneity, thereby preventing the negative active material with too small particle size from affecting the performances of the lithium-ion battery by generating more side reactions with the electrolyte, and also preventing the negative active material with too large particle size from affecting the performances of the lithium-ion the battery by hindering the transmission of the lithium ions inside the negative active material. When the particle size of the negative active material falls within the above preferred ranges thereof, the lithium-ion battery may also have higher energy density.

In the lithium-ion battery of the present disclosure, cold pressing parameters (such as cold pressing speed, cold pressing temperature, cold pressing pressure, cold pressing times and the like) of the electrode plate (i.e. the positive electrode plate and the negative electrode plate) will also affect the orientation degree of the stacked active material particles in the film (i.e. the positive film and the negative film) and further affect the OI value of the film (i.e. the positive film and the negative film), therefore the OI value of the film (i.e. the positive film and the negative film) can also be adjusted by controlling the cold pressing parameters of the electrode plate (i.e. the positive electrode plate and the negative electrode plate). The OI value of the film (i.e. the positive film and the negative film) can also be adjusted by using magnetic field inducing technique during the coating process of the slurry (i.e. the positive slurry and the negative slurry).

In the lithium-ion battery of the present disclosure, the type of the separator is not specifically limited, and the separator may be any separator used in existing batteries, for example, the separator may be a polyethylene membrane, polypropylene membrane, a polyvinylidene fluoride membrane and a multilayer composite membrane thereof, but the present disclosure is not limited thereto.

In the lithium-ion battery of the present disclosure, the electrolyte comprises a lithium salt and an organic solvent, the specific types and the specific components of the lithium salt and the organic solvent are not specifically limited and may be selected based on actual demands. Preferably, the lithium salt may be one or more selected from a group consisting of lithium hexafluorophosphate, lithium tetrafluoroborate and lithium perchlorate; the organic solvent may comprise one or more selected from a group consisting of cyclic carbonate, chain carbonate and carboxylate. The electrolyte may also comprise functional additives, such as vinylene carbonate, ethylene sulfate, propane sultone, fluoroethylene carbonate and the like.

In the lithium-ion battery of the present disclosure, the parameters of the positive active material, the negative active material, the positive electrode plate and the negative electrode plate can be measured as follows, or measured according to other methods known in the art, and the obtained results are both within the error range.

The average particle size D50 of the positive active material and the average particle size D50 of the negative active material may be measured by a laser diffraction particle size analyzer (Mastersizer 3000), a particle size distribution is obtained according to the particle size analysis-laser diffraction method (specifically referring to GB/T19077-2016), and the average particle size is represented by the median value D50 of the volume particle size distribution.

The OI value of the powder of the positive active material and the OI value of the positive film may be obtained by a X-ray powder diffractometer (X'pert PRO), a X-ray diffraction pattern is obtained according to the general rules for X-ray diffractometric analysis JIS K 0131-1996, the OI value=$C_{003}/C_{110}$, $C_{003}$ represents characteristic diffraction peak area of (003) crystal plane, $C_{110}$ represents characteristic diffraction peak area of (110) crystal plane. Specifically, the test method of the OI value of the powder of the positive active material comprises steps of: directly placing a certain amount of the powder of the positive active material in an X-ray powder diffractometer, and obtaining characteristic diffraction peak area of (003) crystal plane and characteristic diffraction peak area of (110) crystal plane by X-ray diffractometric analysis, in turn obtaining the OI value of the powder of the positive active material. Specifically, the test method of the OI value of the positive film comprises steps of: directly placing the prepared positive electrode plate in an X-ray powder diffractometer, and obtaining characteristic diffraction peak area of (003) crystal plane and characteristic diffraction peak area of (110) crystal plane by X-ray diffractometric analysis, in turn obtaining the OI value of the positive film.

The OI value of the powder of the negative active material and the OI value of the negative film may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, the OI value=$C_{004}/C_{110}$, $C_{004}$ represents characteristic diffraction peak area of (004) crystal plane, $C_{110}$ represents characteristic diffraction peak area of (110) crystal plane. Specifically, the test method of the OI value of the powder of the negative active material comprises steps of: directly placing a certain amount of the powder of the negative active material in an X-ray powder diffractometer, and obtaining characteristic diffraction peak area of (004) crystal plane and characteristic diffraction peak area of (110) crystal plane by X-ray diffractometric analysis, in turn obtaining the OI value of the powder of the negative active material. Specifically, the test method of the OI value of the negative film comprises steps of: directly placing the prepared negative electrode plate in an X-ray powder diffractometer, and obtaining characteristic diffraction peak area of (004) crystal plane and characteristic diffraction peak area of (110) crystal plane by X-ray diffractometric analysis, in turn obtaining the OI value of the negative film.

The pressing density of the film (i.e. the positive film and the negative film) is obtained according to an equation m/V, where m represents a weight of the film, V represents a volume of the film. The weight of the film represented by m may be obtained by an electronic balance with an accuracy of 0.01 g or more, the volume of the film represented by V is a product of a surface area of the film and a thickness of the film, and the thickness of the film can be obtained by a spiral micrometer with an accuracy of 0.5 μm.

Hereinafter the present disclosure will be described in detail in combination with examples. It should be noted that, the examples described in the present disclosure are only used for explaining the present disclosure, and are not intended to limit the scope of the present disclosure.

Lithium-ion batteries of examples 1-32 and comparative examples 1-10 were all prepared in accordance with the following preparation method.

(1) Preparation of a Positive Electrode Plate

The positive active material shown in table 1, acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on a positive current collector, drying was then performed under room temperature and continual drying was performed in an oven, which was then followed by cold pressing and plate cutting, finally the positive electrode plate was obtained. The areal density of the positive film was shown in table 1, during the preparation of the positive electrode plate, after a suitable positive active material was selected, the positive films with different OI values and the positive films with different pressing densities could be obtained by appropriately adjusting the cold pressing parameters or additionally using the magnetic field inducing technique.

(2) Preparation of a Negative Electrode Plate

The negative active material shown in table 2, acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on a negative current collector, drying was then performed under room temperature and continual drying was performed in an oven, which was then followed by cold pressing and plate cutting, finally the negative electrode plate was obtained. The areal density of the negative film was shown in table 2, during the preparation of the negative electrode plate, after a suitable negative active material were selected, the negative films with different OI values and the negative films with different pressing densities could be obtained by appropriately adjusting the cold pressing parameters or additionally using the magnetic field inducing technique.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

TABLE 1

Parameters of the positive electrode plates of examples 1-32 and comparative examples 1-10

| | Positive active material | | | Positive film | | | | |
|---|---|---|---|---|---|---|---|---|
| | Type | D50 (μm) | $G_{OI}$ | $PD_c$ (g/dm³) | $\rho_c$ (g/cm²) | $OI_c$ | $OI_c \times PD_c$ | $OI_c \times \rho_c$ |
| Example 1 | NCM523 | 1.5 | 1.2 | 2500 | 0.006 | 4 | 10000 | 0.024 |
| Example 2 | NCM523 | 1.5 | 2.5 | 2500 | 0.0065 | 5 | 12500 | 0.033 |
| Example 3 | NCM523 | 1.5 | 2.6 | 2500 | 0.0065 | 10 | 25000 | 0.065 |
| Example 4 | NCM523 | 2.5 | 5 | 3000 | 0.006 | 10 | 30000 | 0.060 |

TABLE 1-continued

Parameters of the positive electrode plates of examples 1-32 and comparative examples 1-10

| | Positive active material | | | Positive film | | | | |
|---|---|---|---|---|---|---|---|---|
| | Type | D50 (μm) | $G_{OI}$ | $PD_c$ (g/dm³) | $\rho_c$ (g/cm²) | $OI_c$ | $OI_c \times PD_c$ | $OI_c \times \rho_c$ |
| Example 5 | NCM523 | 3.5 | 5.65 | 3200 | 0.0065 | 16 | 51200 | 0.104 |
| Example 6 | NCM523 | 3.5 | 5.65 | 3300 | 0.0072 | 24 | 79200 | 0.173 |
| Example 7 | NCM523 | 5.4 | 6.78 | 3400 | 0.0075 | 26 | 88400 | 0.195 |
| Example 8 | NCM523 | 5.4 | 6.78 | 3450 | 0.0078 | 32 | 110400 | 0.250 |
| Example 9 | NCM523 | 5.4 | 6.78 | 3470 | 0.0082 | 43 | 149210 | 0.353 |
| Example 10 | NCM523 | 5.4 | 6.78 | 3500 | 0.0085 | 52 | 182000 | 0.442 |
| Example 11 | NCM523 | 5.8 | 7.26 | 3520 | 0.0088 | 58 | 204160 | 0.510 |
| Example 12 | NCM523 | 5.8 | 7.26 | 3520 | 0.009 | 64 | 225280 | 0.576 |
| Example 13 | NCM523 | 6.5 | 7.83 | 3600 | 0.0094 | 70 | 252000 | 0.658 |
| Example 14 | NCM523 | 6.5 | 7.83 | 3680 | 0.0096 | 88 | 323840 | 0.845 |
| Example 15 | NCM523 | 6.5 | 7.83 | 4000 | 0.0096 | 100 | 400000 | 0.960 |
| Example 16 | NCM523 | 7.3 | 8.59 | 4000 | 0.0098 | 113 | 452000 | 1.107 |
| Example 17 | NCM523 | 7.3 | 8.59 | 3700 | 0.01 | 149 | 551300 | 1.490 |
| Example 18 | NCM523 | 2.5 | 5 | 3000 | 0.015 | 10 | 30000 | 0.150 |
| Example 19 | NCM523 | 2.5 | 5 | 3000 | 0.015 | 10 | 30000 | 0.150 |
| Example 20 | NCM523 | 2.5 | 5 | 3000 | 0.015 | 10 | 30000 | 0.150 |
| Example 21 | NCM523 | 2.5 | 5 | 3000 | 0.015 | 10 | 30000 | 0.150 |
| Example 22 | NCM523 | 2.5 | 5 | 3000 | 0.015 | 10 | 30000 | 0.150 |
| Example 23 | NCM622 | 8.5 | 3.6 | 3400 | 0.008 | 3 | 10200 | 0.024 |
| Example 24 | NCM622 | 10 | 4.5 | 3900 | 0.018 | 160 | 624000 | 2.880 |
| Example 25 | NCM811 | 9 | 4.8 | 3500 | 0.008 | 2.9 | 10150 | 0.023 |
| Example 26 | NCM811 | 13 | 5.3 | 3600 | 0.018 | 176 | 633600 | 3.168 |
| Example 27 | NCM523 + LiMn₂O₄ (m:m = 7:3) | 12.5 | 14.5 | 3300 | 0.008 | 3 | 9900 | 0.024 |
| Example 28 | NCM523 + LiMn₂O₄ (m:m = 7:3) | 15.8 | 18.8 | 3700 | 0.015 | 178 | 658600 | 2.670 |
| Example 29 | LiCoO₂ | 11.5 | 9.8 | 3900 | 0.008 | 2.6 | 10140 | 0.021 |
| Example 30 | LiCoO₂ | 12.7 | 10.4 | 4200 | 0.015 | 190 | 798000 | 2.850 |
| Example 31 | NCM523 | 5.8 | 7.28 | 3300 | 0.008 | 10.8 | 35640 | 0.086 |
| Example 32 | NCM523 | 8.3 | 12.7 | 3450 | 0.018 | 88 | 303600 | 1.584 |
| Comparative example 1 | NCM523 | 3.5 | 2.3 | 2300 | 0.006 | 2 | 4600 | 0.012 |
| Comparative example 2 | NCM523 | 18.4 | 28.9 | 4000 | 0.035 | 250 | 1000000 | 8.750 |
| Comparative example 3 | NCM622 | 9.8 | 3.2 | 3000 | 0.005 | 2.7 | 8100 | 0.014 |
| Comparative example 4 | NCM622 | 12.5 | 31.4 | 3900 | 0.028 | 308 | 1201200 | 8.624 |
| Comparative example 5 | NCM811 | 7.8 | 2.85 | 2800 | 0.007 | 2.5 | 7000 | 0.018 |
| Comparative example 6 | NCM811 | 14.5 | 35.5 | 4000 | 0.032 | 325 | 1300000 | 10.400 |
| Comparative example 7 | NCM523 + LiMn₂O₄ (m:m = 7:3) | 11.3 | 3.35 | 2800 | 0.006 | 2.9 | 8120 | 0.017 |
| Comparative example 8 | NCM523 + LiMn₂O₄ (m:m = 7:3) | 17 | 21.4 | 4000 | 0.03 | 250 | 1000000 | 7.500 |
| Comparative example 9 | LiCoO₂ | 9.5 | 1.8 | 3500 | 0.013 | 2 | 7000 | 0.026 |
| Comparative example 10 | LiCoO₂ | 13.9 | 22.6 | 4500 | 0.018 | 267 | 1201500 | 4.806 |

TABLE 2

Parameters of the negative electrode plates of examples 1-32 and comparative examples 1-10

| | Negative active material | | | Negative film | | | | |
|---|---|---|---|---|---|---|---|---|
| | Type | D50 (μm) | $V_{OI}$ | $PD_a$ (g/dm³) | $\rho_a$ (g/cm²) | $OI_a$ | $OI_a \times PD_a$ | $OI_a \times \rho_a$ |
| Example 1 | graphite | 6.5 | 4.38 | 1500 | 0.002 | 20 | 30000 | 0.040 |
| Example 2 | graphite | 6.5 | 4.38 | 1500 | 0.002 | 20 | 30000 | 0.040 |
| Example 3 | graphite | 6.5 | 4.38 | 1500 | 0.002 | 20 | 30000 | 0.040 |
| Example 4 | graphite | 6.5 | 4.38 | 1500 | 0.004 | 20 | 30000 | 0.080 |
| Example 5 | graphite | 6.5 | 4.38 | 1500 | 0.004 | 20 | 30000 | 0.080 |
| Example 6 | graphite | 6.5 | 4.38 | 1500 | 0.004 | 20 | 30000 | 0.080 |
| Example 7 | graphite | 6.5 | 4.38 | 1500 | 0.007 | 20 | 30000 | 0.140 |
| Example 8 | graphite | 6.5 | 4.38 | 1500 | 0.007 | 20 | 30000 | 0.140 |
| Example 9 | graphite | 6.5 | 4.38 | 1500 | 0.007 | 20 | 30000 | 0.140 |
| Example 10 | graphite | 6.5 | 4.38 | 1500 | 0.009 | 20 | 30000 | 0.180 |
| Example 11 | graphite | 6.5 | 4.38 | 1500 | 0.009 | 20 | 30000 | 0.180 |
| Example 12 | graphite | 6.5 | 4.38 | 1500 | 0.009 | 20 | 30000 | 0.180 |
| Example 13 | graphite | 6.5 | 4.38 | 1500 | 0.01 | 20 | 30000 | 0.200 |
| Example 14 | graphite | 6.5 | 4.38 | 1500 | 0.01 | 20 | 30000 | 0.200 |
| Example 15 | graphite | 6.5 | 4.38 | 1500 | 0.013 | 20 | 30000 | 0.260 |
| Example 16 | graphite | 6.5 | 4.38 | 1500 | 0.013 | 20 | 30000 | 0.260 |
| Example 17 | graphite | 6.5 | 4.38 | 1500 | 0.018 | 20 | 30000 | 0.360 |
| Example 18 | graphite | 3.5 | 0.5 | 1000 | 0.002 | 20 | 20000 | 0.040 |
| Example 19 | graphite | 4.8 | 3.4 | 1400 | 0.004 | 5 | 7000 | 0.020 |
| Example 20 | graphite | 5.5 | 4.5 | 1500 | 0.008 | 33.5 | 50250 | 0.268 |
| Example 21 | graphite | 5.8 | 5.1 | 1800 | 0.009 | 40 | 72000 | 0.360 |
| Example 22 | graphite | 8.4 | 6.5 | 1400 | 0.01 | 71.5 | 100100 | 0.715 |
| Example 23 | graphite | 6.5 | 4.38 | 1500 | 0.0035 | 20 | 30000 | 0.070 |
| Example 24 | graphite | 6.5 | 4.38 | 1650 | 0.015 | 20 | 33000 | 0.300 |
| Example 25 | graphite + silicon oxide (m:m = 9:1) | 6.5 | 4.38 | 1500 | 0.0035 | 20 | 30000 | 0.070 |
| Example 26 | graphite + silicon oxide (m:m = 9:1) | 6.5 | 4.38 | 1650 | 0.015 | 20 | 33000 | 0.300 |
| Example 27 | graphite | 6.5 | 4.38 | 1500 | 0.0035 | 20 | 30000 | 0.070 |
| Example 28 | graphite | 6.5 | 4.38 | 1650 | 0.015 | 20 | 33000 | 0.300 |
| Example 29 | graphite | 6.5 | 4.38 | 1500 | 0.0035 | 20 | 30000 | 0.070 |
| Example 30 | graphite | 6.5 | 4.38 | 1800 | 0.015 | 30 | 54000 | 0.450 |
| Example 31 | graphite | 12 | 7.56 | 1450 | 0.018 | 56 | 81200 | 1.008 |
| Example 32 | graphite | 15.8 | 8.7 | 1500 | 0.003 | 20 | 30000 | 0.060 |
| Comparative example 1 | graphite | 6.5 | 4.38 | 1500 | 0.025 | 20 | 30000 | 0.500 |
| Comparative example 2 | graphite | 6.5 | 4.38 | 1500 | 0.01 | 20 | 30000 | 0.200 |
| Comparative example 3 | graphite | 6.5 | 4.38 | 1500 | 0.022 | 20 | 30000 | 0.440 |
| Comparative example 4 | graphite | 6.5 | 4.38 | 1500 | 0.015 | 20 | 30000 | 0.300 |
| Comparative example 5 | graphite + silicon oxide (m:m = 9:1) | 6.5 | 4.38 | 1500 | 0.019 | 20 | 30000 | 0.380 |
| Comparative example 6 | graphite + silicon oxide (m:m = 9:1) | 6.5 | 4.38 | 1500 | 0.014 | 20 | 30000 | 0.280 |
| Comparative example 7 | graphite | 6.5 | 4.38 | 1500 | 0.009 | 20 | 30000 | 0.180 |
| Comparative example 8 | graphite | 6.5 | 4.38 | 1500 | 0.01 | 20 | 30000 | 0.200 |
| Comparative example 9 | graphite | 6.5 | 4.38 | 1500 | 0.01 | 20 | 30000 | 0.200 |
| Comparative example 10 | graphite | 6.5 | 4.38 | 1500 | 0.015 | 20 | 30000 | 0.300 |

Hereinafter test processes of the lithium-ion batteries were described.

(1) Test of the Dynamics Performance

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Test of the Cycle Performance

At 25° C., the lithium-ion batteries prepared in the examples and the comparative examples were charged at a constant current of 1 C and discharged at a constant current of 1 C, the fully charging and discharging cycle process was repeated until the capacity of the lithium-ion battery decayed to 80% of the initial capacity, and the cycle number of the lithium-ion battery was recorded.

TABLE 3

Test results of examples 1-32 and comparative examples 1-10

| | $(OI_c \times PD_c)/(OI_a \times PD_a)$ | $(OI_c \times \rho_c)/(OI_a \times \rho_a)$ | Dynamics performance | Cycle number at 1C |
|---|---|---|---|---|
| Example 1 | 0.33 | 0.60 | slight lithium precipitation | 2250 |
| Example 2 | 0.42 | 0.81 | slight lithium precipitation | 2300 |
| Example 3 | 0.83 | 1.63 | no lithium precipitation | 2800 |
| Example 4 | 1.00 | 0.75 | no lithium precipitation | 3250 |
| Example 5 | 1.71 | 1.30 | no lithium precipitation | 3500 |
| Example 6 | 2.64 | 2.16 | no lithium precipitation | 3700 |
| Example 7 | 2.95 | 1.39 | no lithium precipitation | 3750 |
| Example 8 | 3.68 | 1.78 | no lithium precipitation | 3900 |
| Example 9 | 4.97 | 2.52 | no lithium precipitation | 4000 |
| Example 10 | 6.07 | 2.46 | no lithium precipitation | 3950 |
| Example 11 | 6.81 | 2.84 | no lithium precipitation | 3900 |
| Example 12 | 7.51 | 3.20 | no lithium precipitation | 3860 |
| Example 13 | 8.40 | 3.29 | no lithium precipitation | 3550 |
| Example 14 | 10.79 | 4.22 | no lithium precipitation | 3380 |
| Example 15 | 13.33 | 3.69 | no lithium precipitation | 3300 |
| Example 16 | 15.07 | 4.26 | no lithium precipitation | 3260 |
| Example 17 | 18.38 | 4.14 | no lithium precipitation | 3120 |
| Example 18 | 1.50 | 3.75 | no lithium precipitation | 3730 |
| Example 19 | 4.29 | 7.50 | no lithium precipitation | 3580 |
| Example 20 | 0.60 | 0.56 | slight lithium precipitation | 3395 |
| Example 21 | 0.42 | 0.42 | slight lithium precipitation | 2900 |
| Example 22 | 0.30 | 0.21 | slight lithium precipitation | 2860 |
| Example 23 | 0.34 | 0.34 | slight lithium precipitation | 3800 |
| Example 24 | 18.91 | 9.60 | slight lithium precipitation | 2950 |
| Example 25 | 0.34 | 0.33 | slight lithium precipitation | 3720 |
| Example 26 | 19.20 | 10.56 | slight lithium precipitation | 2550 |
| Example 27 | 0.33 | 0.34 | slight lithium precipitation | 3480 |
| Example 28 | 19.96 | 8.90 | slight lithium precipitation | 2360 |
| Example 29 | 0.34 | 0.30 | slight lithium precipitation | 2100 |
| Example 30 | 14.78 | 6.33 | slight lithium precipitation | 2000 |
| Example 31 | 0.44 | 0.09 | moderate lithium precipitation | 1800 |
| Example 32 | 10.12 | 26.40 | moderate lithium precipitation | 1600 |
| Comparative example 1 | 0.15 | 0.02 | serious lithium precipitation | 580 |
| Comparative example 2 | 33.33 | 43.75 | serious lithium precipitation | 540 |
| Comparative example 3 | 0.27 | 0.03 | serious lithium precipitation | 750 |
| Comparative example 4 | 40.04 | 28.75 | serious lithium precipitation | 450 |
| Comparative example 5 | 0.23 | 0.05 | serious lithium precipitation | 700 |
| Comparative example 6 | 43.33 | 37.14 | serious lithium precipitation | 480 |
| Comparative example 7 | 0.27 | 0.10 | serious lithium precipitation | 675 |
| Comparative example 8 | 33.33 | 37.50 | serious lithium precipitation | 500 |
| Comparative example 9 | 0.23 | 0.13 | serious lithium precipitation | 460 |
| Comparative example 10 | 40.05 | 16.02 | serious lithium precipitation | 380 |

In the examples of the present disclosure, by reasonably matching the relationship among the OI value of the positive film represented by $OI_c$, the pressing density of the positive film represented by $PD_c$, the OI value of the negative film represented by $OI_a$ and the pressing density of the negative film represented by $PD_a$ to make the positive film and the negative film satisfy a relationship $0.3 \leq (OI_c \times PD_c)/(OI_a \times PD_a) \leq 20.0$, the lithium ions could deintercalate from the positive electrode plate with a fast speed and then transmit onto the surface of the negative electrode plate with a fast speed and then intercalate into the negative electrode plate with a fast speed, the positive electrode plate and the negative electrode plate could also have smaller chemical rebound and excellent dynamics performance during the charging and discharging process, which was not only beneficial for the deintercalation and the intercalation of the lithium ions, but also beneficial for the transmission of the lithium ions, and in turn the lithium-ion battery could have excellent dynamics performance, and the lithium-ion battery could also have longer cycle life during the long-term fast charging process.

In comparative examples 1-10, the relationship among the OI value of the positive film represented by $OI_c$, the pressing density of the positive film represented by $PD_c$, the OI value of the negative film represented by $OI_a$ and the pressing density of the negative film represented by $PD_a$ was unreasonable, therefore it was not beneficial for obtaining the lithium-ion battery having both excellent dynamics performance and long cycle life.

In comparative examples 1, 3, 5, 7 and 9, both the OI value of the positive film and the pressing density of the positive film were very small and the value of $(OI_c \times PD_c)/$ ($OI_a \times PD_a$) was less than 0.3, when a fast charging was performed on the lithium-ion battery at this time, the lithium ions could deintercalate from the crystal structure of the positive active material with a fast speed and then transmit onto the surface of the negative electrode plate with a fast speed, however, the too fast deintercalation speed and the too fast transmission speed would make the lithium ions be unable to timely intercalate into the negative active material, a part of the lithium ions would be directly reduced and precipitated on the surface of the negative electrode plate and in turn formed into lithium dendrite, thereby significantly affecting the charging capability of the lithium-ion battery. The lithium dendrite with the continual growth would also puncture the separator during the charging and discharging cycle process of the lithium-ion battery and result in larger safety hazard. The lithium dendrite with the continual growth would also consume too many lithium ions, the capacity of the lithium-ion battery during the cycle process would decay too fast, thereby significantly affecting the cycle life of the lithium-ion battery.

In comparative examples 2, 4, 6, 8 and 10, both the OI value of the positive film and the pressing density of the positive film were very large and the value of ($OI_a \times PD_c$)/($OI_a\ PD_a$) was more than 20.0, the swelling of the positive electrode plate was very large and the dynamics performance of the positive electrode plate itself was worse, when a fast charging was performed on the lithium-ion battery at this time, the lithium ions were very difficult to smoothly deintercalate from the crystal structure of the positive active material and the lithium ions were unable to transmit onto the surface of the negative electrode plate with a fast speed, the battery polarization would continually increase during the charging and discharging cycle process, the charging capability of the lithium-ion battery become very bad, and the lithium-ion battery could no longer be charged or could only be charged under a very small current. Moreover, the larger the swelling of the positive electrode plate was, the larger the risk of positive electrode plate fracture and even the risk of internal short circuit of the battery were, the larger the probability of poor electrolyte infiltration due to excessive squeeze on the negative electrode plate was, the larger the looseness degree of the positive active material particles was, and the larger the probability of positive conductive network break was, which would result in a continual increase on the battery polarization during the charging process, a continual increase on the amount of the lithium metal precipitated on a part of the surface of the negative electrode plate and a too fast decay on the capacity of the lithium-ion battery during the cycle process, thereby significantly affecting the cycle life of the lithium-ion battery.

In the examples of the present disclosure, by further reasonably matching the relationship among the OI value of the positive film represented by $OI_c$, the areal density of the positive film represented by pc, the OI value of the negative film represented by $OI_a$ and the areal density of the negative film represented by $\rho_a$ to make the positive film and the negative film further satisfy a relationship $0.1 \leq (OI_c \times \rho_c)/(OI_a \times \rho_a) \leq 15.0$, the lithium-ion battery could have higher energy density, good dynamics performance and longer cycle life at the same time. Referring to example 31 and example 32, the positive film and the negative film did not satisfy a relationship $0.1 \leq (OI_c \times \rho_c)/(OI_a \times \rho_a) \leq 15.0$, the lithium-ion battery could not have higher energy density, good dynamics performance and longer cycle life at the same time. The ratio of $OI_c \times \rho_c$ to $OI_a \times \rho_a$ in example 31 was less than 0.1, although the deintercalation capability with respect to the lithium ions in the positive electrode plate was stronger and the dynamics performance of the positive electrode plate was better at this time, the energy density of the lithium-ion battery was seriously affected, and the improvement on the energy density of the lithium-ion battery was not obvious even if the pressing density of the positive film was further increased. The ratio of $OI_c \times \rho_c$ to $OI_a \times \rho_a$ in example 32 was more than 15.0, although the energy density of the lithium-ion battery was higher at this time, the negative electrode plate could not provide sufficiently enough intercalation space for the lithium ions, therefore the dynamics performance and the cycle life of the lithium-ion battery were affected.

According to the foregoing disclosure and teachings of the present disclosure, a person skilled in the art may also make variations and modifications to the above implementing manners. Therefore, the present disclosure is not limited to the specific implementing manners disclosed and described in the above, modifications and variations of the present disclosure will also be fallen within the scope of the claims of the present disclosure. Furthermore, although specific terminologies are used in the present disclosure, these terminologies are merely for convenience of description, and are not intended to limit the present disclosure.

What is claimed is:

1. A lithium-ion battery comprising a positive electrode plate, a negative electrode plate, a separator and an electrolyte, the positive electrode plate comprising a positive current collector and a positive film, the positive film being provided on at least one surface of the positive current collector and comprising a positive active material, the negative electrode plate comprising a negative current collector and a negative film, the negative film being provided on at least one surface of the negative current collector and comprising a negative active material;

wherein:
the positive active material comprises a layered lithium-containing compound, and the layered lithium-containing compound comprises lithium nickel cobalt manganese oxide or lithium nickel cobalt aluminum oxide;
the negative active material comprises graphite;
the positive film and the negative film satisfy a relationship $0.3 \leq (OIc \times PDc)/(OIa \times PDa) \leq 20.0$;
OIc represents an OI value of the positive film, and OIc-C003/C110, C003 represents characteristic diffraction peak area of (003) crystal plane in X-ray diffraction pattern of the positive electrode plate, C110 represents characteristic diffraction peak area of (110) crystal plane in X-ray diffraction pattern of the positive electrode plate;
PDc represents a pressing density of the positive film with a unit of g/dm3;
OIa represents an OI value of the negative film, and OIa-C004/C110, C004 represents characteristic diffraction peak area of (004) crystal plane in X-ray diffraction pattern of the negative electrode plate, C110 represents characteristic diffraction peak area of (110) crystal plane in X-ray diffraction pattern of the negative electrode plate;
PDa represents a pressing density of the negative film with a unit of g/dm3;
the OI value of the positive film represented by OIc is 8-70; and
an OI value of a powder of the positive active material represented by Gor is from 3 to 15, wherein, Gor-C003/C110, C003 represents characteristic diffraction peak area of (003) crystal plane in X-ray diffraction pattern of the powder of the positive active material, C110 represents characteristic diffraction peak area of (110) crystal plane in X-ray diffraction pattern of the powder of the positive active material.

2. The lithium-ion battery according to claim 1, wherein the positive film and the negative film satisfy a relationship $1.71 \leq (OIc \times PDc)/(OIa \times PDa) \leq 8.40$.

3. The lithium-ion battery according to claim 2, wherein the positive film and the negative film satisfy a relationship $2.64 \leq (OIc \times PDc)/(OIa \times PDa) \leq 6.0$.

4. The lithium-ion battery according to claim 3, wherein the positive film and the negative film satisfy a relationship $3.68 \leq (OIc \times PDc)/(OIa \times PDa) \leq 6.0$.

5. The lithium-ion battery according to claim 1, wherein the positive film satisfies a relationship $79200 \leq OIc \times PDc \leq 323840$; and/or
the negative film satisfies a relationship $20000 \leq OIa \times PDa \leq 50250$.

6. The lithium-ion battery according to claim 5, wherein the positive film satisfies a relationship $110400 \leq OIc \times PDc \leq 182000$.

7. The lithium-ion battery according to claim 5, wherein the negative film satisfies a relationship $20000 \leq OIa \times PDa \leq 30000$.

8. The lithium-ion battery according to claim 1, wherein the OI value of the positive film represented by OIc is 10-70; and/or
the OI value of the negative film represented by OIa is 5-40.

9. The lithium-ion battery according to claim 1, wherein the OI value of the positive film represented by OIc is 24-52.

10. The lithium-ion battery according to claim 1, wherein the pressing density of the positive film represented by PDc is $3.3 \times 10^3$ g/dm$^3$–$3.5 \times 10^3$ g/dm$^3$; and/or
the pressing density of the negative film represented by PDa is $1.4 \times 10^3$ g/dm$^3$–$1.65 \times 10^3$ g/dm$^3$.

11. The lithium-ion battery according to claim 1, wherein the positive film and the negative film satisfy a relationship $1.78 \leq (OIc \times \rho c)/(OIa \times \rho a) \leq 6.0$;
$\rho c$ represents an areal density of the positive film with a unit of g/cm$^2$;
$\rho a$ represents an areal density of the negative film with a unit of g/cm$^2$.

12. The lithium-ion battery according to claim 11, wherein
the positive film and the negative film satisfy a relationship $2.52 \leq (OIc \times \rho c)/(OIa \times \rho a) \leq 6.0$.

13. The lithium-ion battery according to claim 11, wherein
the positive film satisfies a relationship $0.173 \leq OIc \times \rho c \leq 0.845$; and/or
the negative film satisfies a relationship $0.080 \leq OIa \times \rho a \leq 0.360$.

14. The lithium-ion battery according to claim 13, wherein
the positive film satisfies a relationship $0.353 \leq OIc \times \rho c \leq 0.845$; and/or
the negative film satisfies a relationship $0.140 \leq OIa \times \rho a \leq 0.20$.

15. The lithium-ion battery according to claim 11, wherein
the areal density of the positive film represented by $\rho c$ is 0.01 g/cm$^2$–0.02 g/cm$^2$; and/or
the areal density of the negative film represented by $\rho a$ is 0.007 g/cm$^2$–0.013 g/cm$^2$.

16. The lithium-ion battery according to claim 15, wherein
the areal density of the positive film represented by $\rho c$ is 0.015 g/cm$^2$–0.02 g/cm$^2$; and/or
the areal density of the negative film represented by $\rho a$ is 0.007 g/cm$^2$–0.009 g/cm$^2$.

17. The lithium-ion battery according to claim 1, wherein
an average particle size D50 of the positive active material is 2 μm-10 μm; and/or
an average particle size D50 of the negative active material is 4 μm-15 μm.

18. The lithium-ion battery according to claim 17, wherein
the average particle size D50 of the positive active material is 2.5 μm-7.3 μm; and/or
the average particle size D50 of the negative active material is 5.5 μm-12 μm.

19. The lithium-ion battery according to claim 1, wherein at least a part of the positive active material is single particle.

20. The lithium-ion battery according to claim 1, wherein the OI value of a powder of the positive active material represented by GOI is from 5 to 10.

* * * * *